(12) United States Patent
Weiss

(10) Patent No.: US 6,700,267 B2
(45) Date of Patent: Mar. 2, 2004

(54) TRANSVERSE FLUX DRIVE

(75) Inventor: Heinz Weiss, Bensheim (DE)

(73) Assignee: Deere & Company, Moline, IL (US)

( * ) Notice: Subject to any disclaimer, the term of this patent is extended or adjusted under 35 U.S.C. 154(b) by 47 days.

(21) Appl. No.: 10/057,536

(22) Filed: Jan. 25, 2002

(65) Prior Publication Data
US 2002/0121826 A1 Sep. 5, 2002

(30) Foreign Application Priority Data
Mar. 1, 2001 (DE) .......................... 101 09 774

(51) Int. Cl.$^7$ .............................................. H02K 17/44
(52) U.S. Cl. ....................... 310/112; 310/114
(58) Field of Search ................ 310/112, 114, 310/191, 75 C; H02K 21/02, 1/06, 19/00

(56) References Cited

U.S. PATENT DOCUMENTS

| 1,522,742 A | * | 1/1925 | Parvin ..................... 310/112 |
| 1,763,104 A | * | 6/1930 | Shurtleff ................. 388/816 |
| 2,748,334 A | * | 5/1956 | Miller ..................... 318/831 |
| 3,233,133 A | | 2/1966 | Kolen |
| 4,578,609 A | | 3/1986 | McCarty ................. 310/156 |
| 4,709,619 A | * | 12/1987 | Bartholomaus et al. ... 92/130 D |
| 5,164,623 A | * | 11/1992 | Shkondin ............... 310/67 R |
| 5,289,072 A | | 2/1994 | Lange ..................... 310/266 |
| 5,763,977 A | | 6/1998 | Shimasaki et al. .......... 310/191 |

FOREIGN PATENT DOCUMENTS

| DE | 35 36538 A1 | 4/1987 | ............ H02K/1/06 |
| DE | 42 39 106 A1 | 4/1993 | .......... H02K/21/02 |
| DE | 197 23 776 A1 | 12/1997 | ............ B60K/1/00 |
| DE | 197 43 906 A1 | 4/1999 | ............ B60K/1/00 |
| EP | 0 864 457 A2 | 9/1998 | ............ B60K/6/02 |
| EP | 858 148 | 8/1999 | .......... H02K/21/12 |
| GB | 2056725 | 3/1979 | ............ H02P/9/00 |

OTHER PUBLICATIONS

Rolf Blissenbach and Gerhard Henneberger, Numerical Calculation of 3D Eddy Current Fields in Transverse Flux Machines with Time Stepping Procedures: pp. 1–13.

* cited by examiner

Primary Examiner—Nicholas Ponomarenko
Assistant Examiner—Nguyen N Hanh

(57) ABSTRACT

A transverse flux drive includes a first component and a second component which is rotatable with respect to the first component. A pair of transverse flux motor units are coupled between the first and second components. Each motor unit includes a plurality of U-shaped armature elements which are coupled to the first component and which enclose an circumferentially extending exciter winding. Each motor unit also includes a plurality of permanent magnet pole elements coupled to the second component. The pole elements of one motor are axially movable to attenuate the magnetic flux coupling between the elements of the motor.

9 Claims, 3 Drawing Sheets

TRANSVERSE FLUX DRIVE

FIELD OF THE INVENTION

The present invention relates to a drive with a pair of transverse flux motors coupled between first and second relatively rotatable components.

BACKGROUND OF THE INVENTION

A transverse flux electrical motor with two rows of elements is described in U.S. Pat. No. 5,289,072. In this design, a rotor is mounted so that it can rotate about a shaft in a stator housing. The rotor comprises a central disk on whose radially outer circumference a pole structure is arranged on each axial side. The pole structure includes a series of permanent magnets arranged in the circumferential direction and polarized in an alternating manner. The pole structures are opposed, separated by an air gap, by a stator consisting of an outer stator located radially on the outside and of an inner stator located radially on the inside. The outer stator includes U-shaped armature elements whose legs stand opposite the permanent magnets of the pole structures. A ring winding running in the circumferential direction of the rotor is inside the legs. The inner stator includes yoke elements forming the magnetic circuits with the permanent magnets.

A transverse flux motor with permanent excitement and a pair of sections or branches is shown in DE-A-35 36 538. In this design individual segments or armature element areas can be disabled or deactivated by their associated inverters. In the case of winding damage, partial segments can be radially removed without disassembling the entire machine, leaving the remaining segments operational.

In comparison to longitudinal flux machines of the same size, transversal flux machines develop a significantly greater torque. They are therefore particularly suitable for direct drives in vehicles and they permit the elimination of expensive and inefficient mechanical transmissions. However, the torque requirements of vehicle drives can vary greatly depending on the type of use. Thus, an especially high torque is demanded from a tractor for use during plowing at a relatively slow travel and low wheel speeds, whereas significantly lower torques are required for a transport operation at relatively high travel speeds and high wheel speeds. Conventional transverse flux machines do not take into account these differing torque requirements. It would be desirable to provide such a transverse flux drive which can be adapted to varying torque requirements.

SUMMARY OF THE INVENTION

An object of the present invention is to provide such a transverse flux drive which can be adapted to varying torque requirements.

This and other advantages are achieved by the present invention wherein a transverse flux drive includes first and second relatively rotatable components and a pair of transverse flux motor units coupled therebetween. Each motor unit includes U-shaped armature elements coupled to the first component and permanent magnet pole elements coupled to the second component. The armature elements and the pole elements form circumferentially equidistantly spaced magnetic circuit elements. Each armature element encloses an exciter winding extending in the circumferential direction.

The polarity of the adjacent magnets alternates in the circumferential direction. A soft-iron lamellar packet is preferably arranged between each pair of permanent magnets. According to the invention, one or more of the pole elements can be axially shifted and de-coupled from their magnetic flux circuit.

When shifted, the shifted pole elements are removed from the magnetic field or the magnetic flux so that the total flux of the motor is attenuated. In other words, as a result of an axial shifting of the pole elements, the armature elements are spatially removed from the region of influence of the pole elements so that the affected magnetic circuit is ineffective. The associated pole elements then merely rotate by entrainment and do not contribute to the operative motor force. In the case of only partial axial shifting of the magnetic pole elements, the field attenuation is reduced.

Preferably, the first component, which carries the armature elements and exciter winding, is a non-rotating stator. The second component which carries the magnetic pole elements, is preferably a rotor which is rotatable with respect to the stator. As a result, slip rings for the electrical supply of the exciter winding can be eliminated and no rotary coolant communication are required to cool the exciter winding. The pole elements of each motor unit are preferably arranged in a yoke element which rotates in with a rotor of the transverse flux drive.

Preferably, one motor unit is fixed and the motor unit has elements which can be shifted axially to entirely or partially interrupt the magnetic circuits associated with such elements.

Preferably, the magnetic circuit elements of the two motor units are staggered in relation to each other in a circumferential direction. For example, the armature elements of the two motor units are staggered in the circumferential direction, whereas the magnetic pole elements of the two motor units are not stagger with respect to one another. Alternatively, it is also possible to stagger the magnetic pole elements relative to one another. If only two motor units are used, the offset preferably corresponds approximately to one half the circumferential interval of the particular elements. The result is in a drive in which the flow of the power of the sections is shifted in time so that the machine starts more smoothly and runs more uniformly.

The armature elements of each section are inductively coupled by a single, continuous, exciter winding, such as a concentric ring coil, in order to simplify the design and reduce winding losses.

Preferably, a shifting device makes a shifting possible during the operation of the transverse flux drive. Thus, different torque requirements can be reacted to during the operation without having to stop the drive in order to intervene in the drive system. This is especially advantageous for drive systems of work vehicles because the drive can be adapted to changing torque requirements, such as when changing between the start of the work and the transport operation, without interrupting the operation.

Preferably, a control device detects the drive speed and carries out automatic shifting if a speed limit is exceeded or dropped below. Different speed limits can be set in order to produce shift increase or decrease the flux. It is advantageous for stable operation to shift to lower the flux in the case of a rather low speed limit than to carry out the shifting in the sense of an increase of flux.

The stator housing includes at least one hydraulic chamber which slidably receives a piston which is coupled to at least one pole element. The hydraulic components are thus located in the stator housing so that rotating hydraulic connections are avoided and the hydraulic system is not exposed to the rotary stresses of a rotor.

A return spring engages the piston and is biased to urge the piston into its initial position, in which the pole elements are part of a magnetic flux circuit. In response to hydraulic pressure, the piston can shift entirely or partially into a disengaged position in which the pole element is entirely or partially removed from its magnetic circuit.

Preferably, the transverse flux drive is an integral part of a wheel hub, such as the wheel hub of a work vehicle, so that the rotating component drives a vehicle wheel. The result is a complete yet versatile compact module which unites the drive function and the wheel function. Such a module is especially advantageous in a vehicle with electric individual-wheel drive, such as shown in DE-A-197 23 776 and EP-A-0 864 457. The rotating component preferably forms a rim for a vehicle tire. The rim is cylindrical and has wheel flange on each axial side. One of the wheel flanges can be fastened by a screw connection and can be removed to simplify tire mounting. Preferably, the stator is coupled to a vehicle axle, such as a rigid axle, a steering axle and/or a spring-suspended or non-spring-suspended axle.

DESCRIPTION OF THE PREFERRED EMBODIMENT

Figure 1:
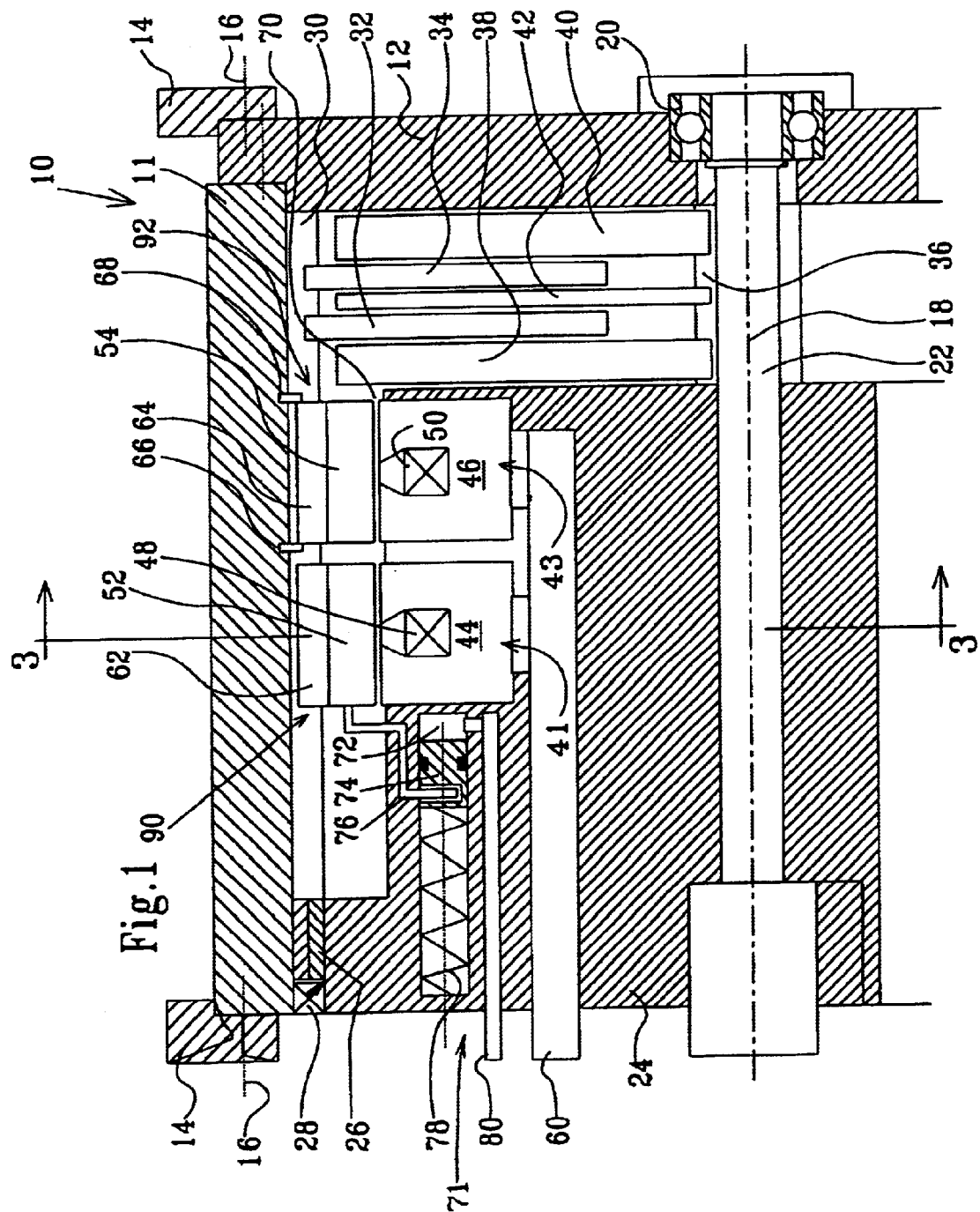
FIG. 1 is a partial sectional view of a vehicle wheel hub with an integral transverse flux drive with motor units in which all magnetic circuit elements are in an operative state.
Figure 2:
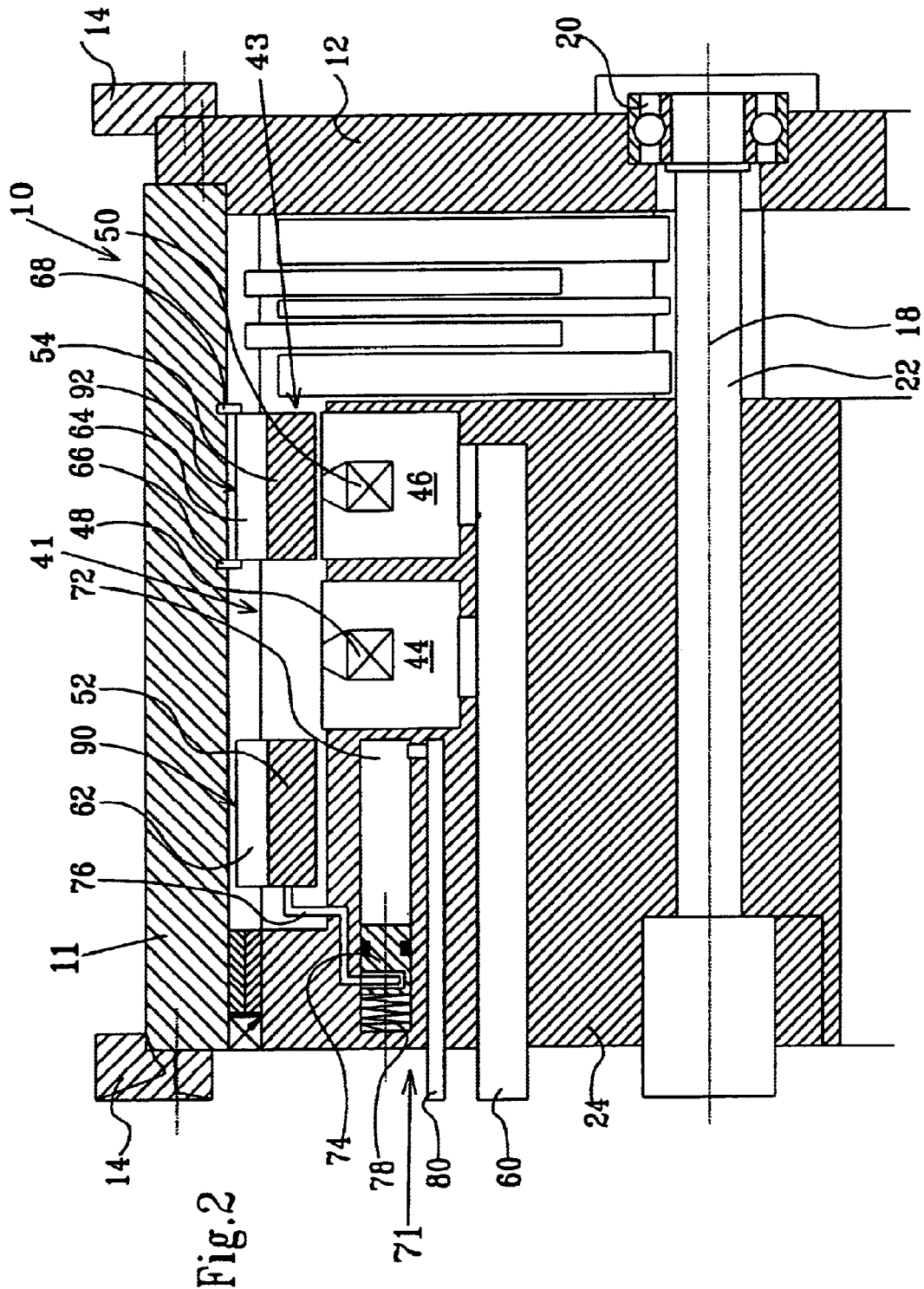
FIG. 2 is a view similar to FIG. 1 in which magnetic circuit elements of one of the motor units are in an inoperative state.

FIGS. 1 and 2 show the upper half of a wheel hub assembly 10 which is substantially symmetric with respect to rotation axis 18 and includes a wheel disk 12 fastened to a rim 11. Rim or rotor 11 is manufactured from aluminum and receives a vehicle tire (not shown). Wheel flanges 14 project radially from each axial side of the rim 11. Each wheel flange 14 can be fastened to rim 11 by screws 16 distributed over a circumference. In order to mount and demount a tire, at least one of wheel flanges 14 can be screwed off so that the tire can be pushed onto rim 11 without having to lever it over wheel flange 14.

Rim 11 is rotatable about an axis of rotation 18, is supported by wheel disks 12 arranged on the right via fixed bearing 20. Bearing 20 is a sliding bearing or roller bearing on non-rotatable wheel axle 22. Axle 22 may be coupled to a vehicle axle (not shown). An aluminum stator 24 is rigidly fastened on wheel axle 22. This unitary connection can be established, e.g., with wedges (not shown).

One end of the rim 11 is supported on stator 24 via movable bearing 26 which is a sliding bearing or roller bearing and permits an axial compensation. Seal 28 seals the area between stator 24 and rotor 10 with respect to the exterior.

The radially inner surface of rim 11 forms axially aligned cogs 30 that extends substantially over the entire axial length and which engage corresponding cogs of two brake disks 32, 34 so that brake disks 32, 34 are connected to and rotate with rim 11. Cogs 36 project outwardly from a portion of axle 22 and non-rotatably engage corresponding cogs of two pressure plates 38, 40. Components 32, 34, 38, 40 and 42 form a disk brake system integrated into wheel hub 10. Such a disk brake system is known and conventional in the construction of tractors.

Figure 3:
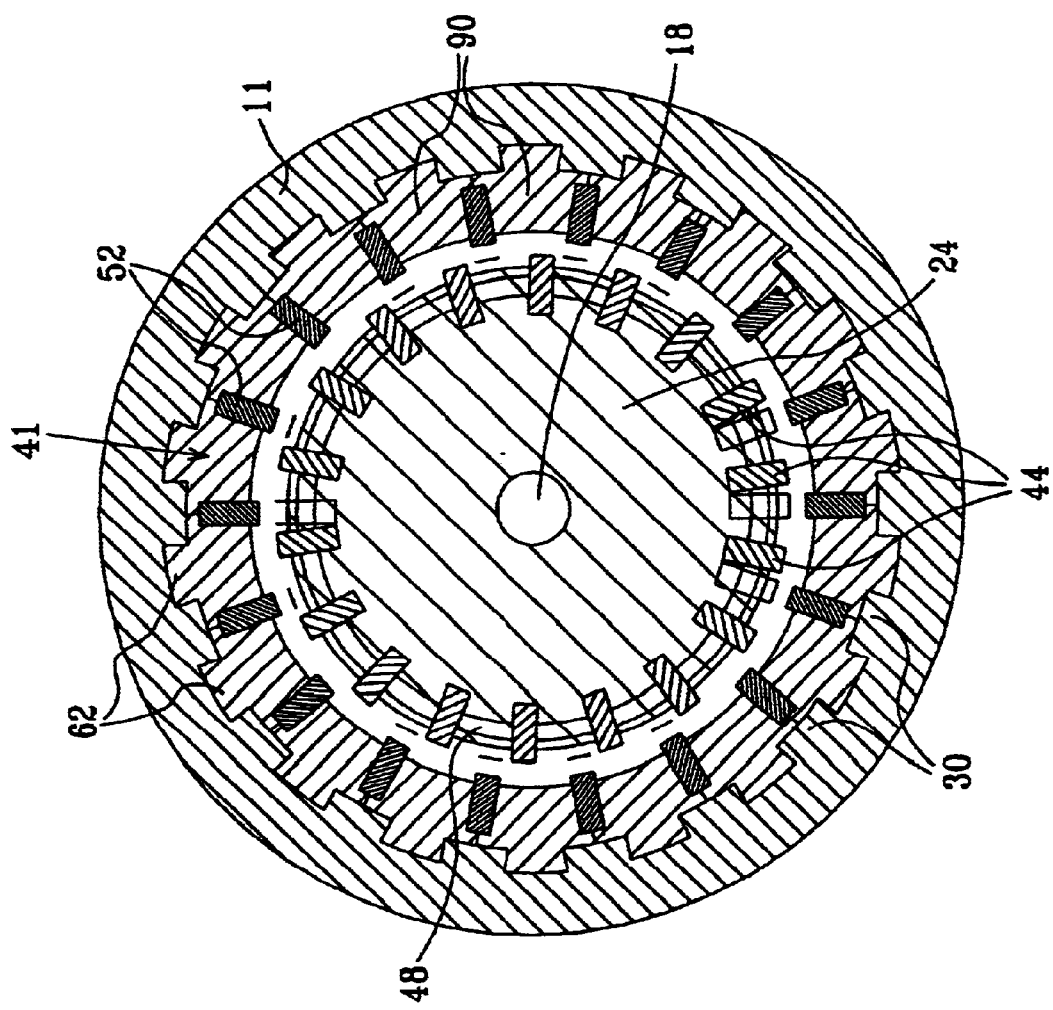
FIG. 3 is a sectional view in the direction of arrows 3—3 of FIG. 1.

Hub assembly 10 includes two axially spaced apart transverse motor units 41 and 43. The left motor unit 41 is shown in cross-section in FIG. 3. As best seen in FIGS. 1 and 3, the motor units 41, 43 include a number of U-shaped armature elements 44, 46 which are spaced uniformly and circumferentially apart and which enclose ring coils 48, 50. The motor units also include an equal number of uniformly spaced apart permanent magnet pole elements 52, 54 mounted in soft iron yoke elements 90, 92.

The armature elements 44, 46 are mounted in stator 24 and consist of layered soft-iron sheets. The armature elements 44, 46 are separated from pole elements 52, 54 by an annular air gap 70 of approximately 1 millimeter. Ring coils or armature coils 48, 50 are conventionally cooled by coolant supplied through conduit 60 formed in stator 24.

The magnetic poles of circumferentially adjacent pole elements 52, 54 are alternately oriented. Each circumferentially adjacent pair of pole elements are mutually polarized in the usual manner. The yoke elements 90, 92 include radially outwardly projecting cogs 62, 64 which mesh with cogs 30 which project inwardly from rim 11 so that the pole elements 52, 54 rotate with rim 11.

Pole elements 54 of motor unit 43 are prevented from shifting axially by left and a right guard rings 66, 68 set in associated grooves of rim 11. Thus, pole elements 54 of motor unit 43 are magnetically coupled to armature elements 46 at all times.

With respect to motor unit 41, the radial outer ends of armature elements 44 are aligned and magnetically coupled to the pole elements 52 to create a magnetic flux which is influenced by alternating current in armature windings 48.

In contrast to the axially fixed pole elements 54, pole elements 52 can be shifted axially to the left by a shifting device 71 from the position shown in FIG. 1, to the position shown in FIG. 2 in which pole elements 52 are no longer influenced by armature elements 44 of the motor unit 41. During the shift the cogs 62 remain engaged with cogs 30 of rim 11 so that rim 11 remains rotationally coupled with pole elements 52.

If pole elements 52 are shifted to the left and are magnetically uncoupled from armature elements 44. In this position there is no magnetic interaction between magnetic pole elements 52 and armature elements 44 and pole elements 52 are merely entrained mechanically with the rotation of rim 11.

The shifting device 71 includes a hydraulic chamber 72 formed in stator 24 which slidably receives a hydraulic piston 74. Chamber 72 can also be an annular chamber arranged concentrically to the rotation axis 18 or several individual chambers arranged in the circumferential direction. Piston 74 is coupled via a linkage 76 (shown only schematically) to pole elements 52 so that pole elements 52 move axially with the piston 74. Piston 74 is urged to the right by pressure spring 78 supported on the left front side of chamber 72. Chamber 72 communicates via hydraulic line 80 with a hydraulic control device (not shown) which controls the pressure in chamber 72 as a function of control signals. If chamber 72 is unpressurized, spring 78 urges piston 74 and with it pole elements 52 into the position shown in FIG. 1.

While the present invention has been described in conjunction with a specific embodiment, it is understood that many alternatives, modifications and variations will be apparent to those skilled in the art in light of the foregoing description. For example, one or more of the armature elements can be arranged to be axially shifted together with the associated exciter winding. Accordingly, this invention is intended to embrace all such alternatives, modifications and variations which fall within the spirit and scope of the appended claims.

What is claimed is:

1. A transverse flux drive having a first component and a second component rotatable with respect to the first component, and first and second transverse flux motors coupled between the first and second components, each motor having a plurality of magnetic pole elements and a plurality of armature elements, wherein:

the first component comprises a non-rotating stator and the second component comprises a rotor which rotates relative to the stator, the pole elements of each motor are coupled to rotate with the rotor;

at least one of said pole elements and armature elements of one of said motors being axially movable to a position wherein it is magnetic uncoupled from its corresponding armature or pole element; and the pole elements of one motor are coupled to the rotor by members which prevent said pole elements from moving axially with respect to the rotor, and the pole elements of the other motor are coupled to the rotor and are axially movable with respect to the rotor.

2. The transverse flux drive of claim 1, wherein:
   the armature elements are inductively coupled by a single continuous, exciter winding.

3. The transverse flux drive of claim 1, further comprising:
   a shifting device is coupled to one of the pole or armature elements and is operable to shift said element axially during operation of the transverse flux drive.

4. The transverse flux drive of claim 3, wherein:
   the shifting device is a hydraulic shifting device.

5. The transverse flux drive of claim 1, further comprising:
   a wheel hub for coupling to a wheel.

6. The transverse flux drive of claim 5, further comprising:
   a rim for supporting a vehicle tire.

7. A transverse flux drive having a first component and a second component rotatable with respect to the first component, and first and second transverse flux motors coupled between the first and second components, each motor having a plurality of magnetic pole elements and a plurality of armature elements, wherein:

the first component comprises a non-rotating stator and the second component comprises a rotor which rotates relative to the stator;

at least one of said pole elements and armature elements of one of said motors being axially movable to a position wherein it is magnetic uncoupled from its corresponding armature or pole element; and the stator includes a housing which encloses a hydraulic chamber which slidably receives a piston which is coupled to an axially movable pole element.

8. The transverse flux drive of claim 7, wherein:
   a spring member urges the piston to a first position wherein the movable pole element is in a magnetic circuit, and the piston is movable to a second position wherein the movable pole element is entirely or partially removed from said magnetic circuit.

9. The transverse flux drive of claim 7, wherein:
   the stator is connected to a vehicle axle.

* * * * *